Nov. 15, 1966   F. J. PERHATS   3,286,058
VEHICLE CONTROL SWITCH
Filed May 18, 1964
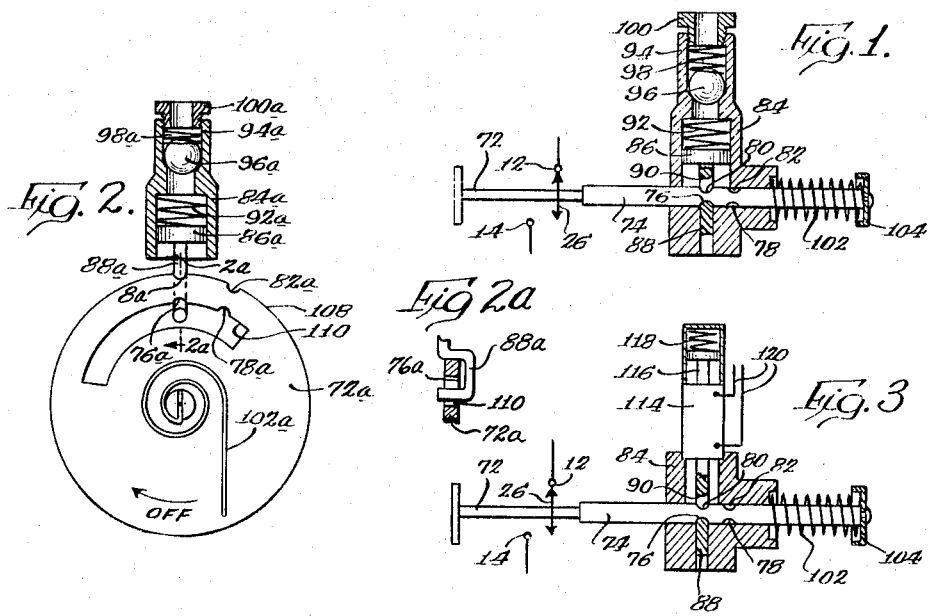
INVENTOR.
Francis J. Perhats
BY
Dary, Parker, Juettner & Cullinan
Attys

United States Patent Office 3,286,058
Patented Nov. 15, 1966

3,286,058
VEHICLE CONTROL SWITCH
Francis J. Perhats, 30 Rozanne Drive, Addison, Ill.
Filed May 18, 1964, Ser. No. 368,145
9 Claims. (Cl. 200—82)

This invention relates to a control switch for motor vehicles, and more particularly, to a manually set switch that subsequently operates automatically in response to a change in operation of the vehicle.

In order to acquaint those skilled in the art with the manner of making and using my vehicle control switch, I shall describe, in conjunction with the accompanying drawings, preferred embodiments of the invention and the preferred manners of making and using the same.

In the drawings, wherein like reference symbols indicate like parts:

FIGURE 1 is a cross-sectional schematic view of one embodiment of the vehicle control switch as associated with vehicle headlight and parking light circuits, the view illustrating the switch in closed circuit position for energizing the parking lights during normal operation of the vehicle;

FIGURE 2 is a cross-sectional schematic view of a second embodiment of my vehicle control switch similar to the embodiment of FIGURE 1 but adapted to rotary actuation, the view illustrating the switch in a closed circuit position;

FIGURE 2a is a fragmentary sectional view taken substantially on line 2a—2a of FIGURE 2; and FIGURE 3 is a cross-sectional schematic view of a third embodiment of my control switch, illustrating the switch in a closed circuit condition similar to that of FIGURE 2.

In its broader aspects, the control switch of the invention includes electrical circuit contacts and a control member associated with the contacts and movable between open and closed circuit positions. The switch includes means biasing the control member toward open circuit position, and the control member is manually movable from open to closed position against the force of the biasing means. Detent means are provided for engagement with the control member when in closed position, for retaining the member against the force of the biasing means. Means connectable to an energy source variable in response to the operation of a motor vehicle engine serve to operate or control the detent means to cause the same to perform respective retaining functions when the engine is and is not operating in a predetermined manner, and for temporarily removing the retaining force upon predetermined changes in engine operation.

FIGURES 1 and 2 illustrate embodiments of the conrol switch which may be connected to the intake manifold of a vehicle engine for automatic operation from switch closed to switch open position each time the engine is turned on or off. These embodiments afford the particular advantages that they are of simplified construction and operation, are economical, and operate automatically to turn the lights off (if they are on) upon occurrence of either stopping or starting of the vehicle engine.

In particular, with reference to FIGURE 1, the illustrated embodiment of the switch incorporates a pair of fixed contacts 12 and 14 for the vehicle parking light circuit and headilght circuit, respectively. A control member or rod 72 having an enlarged shank 74 is mounted for reciprocal movement, from an open circuit position to respective closed circuit positions wherein its contact 26 engages the respective fixed contacts 12 and 14. The shank is provided with four recessed portions 76, 78, 80 and 82. The first and second recessed portions 76 and 78 are disposed in spaced apart succession on one side of the shank (the lower side as illustrated) at a spacing corresponding to that of the contacts 12 and 14. The third and fourth recessed portions 80 and 82 are disposed on the opposite side of the shank 74 and are aligned vertically with the recesses 76 and 78, respectively.

A pressure cylinder 84 is mounted in perpendicular relation to the control member 72, and the control member extends therethrough and is transversely reciprocably movable therein. A piston 86 is mounted for reciprocal movement in the cylinder perpendicularly to the control member, and a detent 88 cooperable with said member is fixed to the piston for movement therewith. The detent has an opening 90 therethrough, and the control member shank 74 extends through the opening. One edge of the detent bordering its opening may be received in either of the lower recessed portions 76 and 78, and the opposite edge of the detent may be received in either of the upper recessed portions 80 and 82, for locking the control member shank in adjusted position.

A piston biasing spring 92 is mounted in the cylinder for normally urging the detent against the side of the shank bearing the recessed portions 80 and 82. A port 94 integral with the cylinder communicates with the piston behind its spring. A valve ball 96 is positioned in the port, and biased into seating engagement by a coil spring 98. The spring is held in place by a threaded coupling 100 threaded in the port. A coil spring 102 is mounted about the control member between the cylinder and a retainer 104 on the protruding end of the member, which spring biases the member inwardly from the fixed contacts toward an open circuit position wherein the detent 88 bears on the shank 74 and engages none of its recesses.

In use, the control switch is installed in a motor vehicle with its coupling 100 connected to the intake manifold. With the engine running, the control member 72 may be pulled out to engage its contact 26 with the contact 12 to close the parking light circuit or with the contact 14 to close the headlight circuit. Suction from the intake manifold acts to raise the valve ball 96 and move the piston 86 away from the shank 74. The outer bordering edge of the detent 88 engages the recessed portion 76 when the control member contact 26 engages the contact 12, and the recessed portion 78 when the control member contact engages the contact 14. The circuit remains closed so long as engine operation continues. When operation is discontinued, atmospheric pressure is restored behind the piston 86, causing it to move towards the shank 74, thereupon releasing the detent from the shank and permitting the spring 102 to move the control member inwardly to open circuit position.

The fit of the valve ball 96 provides a restricted flow path in the port 94, so that pressure is restored slowly behind the piston, thereby to afford a time delay in restoration of the switch to open circuit position. This delay may be utilized to accommodate and compensate for temporary interruptions of normal engine operation and also to furnish illumination for a period of time after parking the vehicle, thereby to permit the driver to walk for example from his driveway to his house before the lights are automatically turned off.

When it is desired to energize either the parking light circuit or the head light circuit after discontinuing engine operation, the control member 72 is pulled outwardly until its contact 26 engages the contact 12 or the contact 14. The inner edge of the detent 88 then engages the recessed portion 80 or 82 respectively, to maintain the control member in closed circuit position against the force of its biasing spring 102. When engine operation is again resumed, the piston 86 is retracted to release the detent 88 from engagement with the control member shank 74, wherupon the spring 102 returns the control member 72 and its contact 26 to open circuit position.

Thus, the headlights or parking lights, if on, are automatically turned off upon each predetermined change in engine operation, i.e., upon stopping the engine if it were running or starting the engine if it were stopped. At the same time, the advantage of the time delay in opening the circuit is available to the operator, and also the switch is always under the manual control of the vehicle operator simply by pushing or pulling the control member 72.

FIGURES 2 and 2a illustrate a further embodiment of the new control switch which is essentially similar to the embodiment of FIGURE 1, except that it is of the rotary type. As shown, the switch includes a manually rotatable circular control member or disk 72a having an arcuate engagement strip 108 on its periphery and a concentric arcuate slot 110 inwardly thereof. First and second recessed portions 76a and 78a are provided at the outer edge of the slot 110, and third and fourth recessed portions 80a and 82a, aligned respectively with the notches 76a and 78a, are provided on the outer edge 108. As in the preceding embodiment, the control member is provided with a contact for successive engagement with first and second spaced fixed parking light and headlight contacts (not shown). The control member is biased in clockwise direction toward open circuit or off position by a torsion spring 102a.

The switch includes a pressure cylinder 84a and a piston 86a reciprocally mounted therein and biased towards the control member by a spring 92a. A detent member 88a is fixed to the piston for engagement with the notched edges 108 and 110. Specifically, a pair of spaced horizontal legs formed by a U-shaped bend in the detent member are disposed for engagement with the edges 108 and 110, respectively. A port 94a communicates with the piston behind its spring and a valve ball 96a is seated in the port and maintained in seating engagement by a spring 92a. A coupling 100a retains the spring in place and serves for connecting the switch to the intake manifold of the vehicle engine.

With the engine in operation, the piston head 86a is moved away from the control member by the resulting pressure differential on the head. The control member may be turned in the counter-clockwise direction to engage one of the recessed portions 76a and 78a with the lower leg of the U-shaped portion of the detent 88a, for energizing the corresponding parking light or headlight circuit. When engine operation is discontinued, the piston head moves towards the control member and the lower leg of the detent is disengaged from the notched edge 110, whereupon the control member is restored to open circuit position by the biasing spring 102a. When the engine is not in operation, the control member may be turned to a closed circuit position wherein the upper leg of the detent engages the recessed portion 80a or the recessed portion 82a. When engine operation is next resumed, the detent is retracted again releasing the control member for return to open circuit position under the bias of spring 102. The switch is thus automatically restored to open circuit position when engine operation is either started or stopped. The switch may be manually moved to any desired circuit position at any time by turning the control member. As in the embodiment of FIGURE 1, the valve ball 96a forms a restricted flow passage with the port 94a, to provide a time delay in automatic opening of the circuit.

FIGURE 3 illustrates another embodiment of my new control switch, which is the same as the embodiment of FIGURE 1 except for the manner of mounting and operating the detent 88. Specifically, a solenoid 114 is mounted on the cylinder 84 in place of the vacuum manifold port 94, and the detent 88 is fixed to the plunger 116 of the solenoid. The plunger and the detent are biased towards the control member shank 74 by a coil spring 118. Electrical conductors 120 on the solenoid may be connected in the ignition circuit or to the generator output of a vehicle engine. When the ignition circuit is closed or the generator is charging, the solenoid coil is energized to move the plunger 116 away from the control member shank. Thus, the switch functions in the same manner as the switch of FIGURE 1 during engine operation and when operation is discontinued. When the solenoid is connected to the generator output, the switch functions as if the engine were off when the generator is not charging. This type of connection may be employed to open the light circuits or other appropriate circuits when the engine is idling. If desired, time delay means may be provided as in the preceding embodiments, to delay the opening of the circuits for a predetermined idling or engine shutoff period.

It will be apparent that the new control switch may be appropriately employed in the same or modified form for connection to other energy sources variable in response to the operation of a motor vehicle engine. For example, the energy source may constitute one of the hydraulic systems of the vehicle or a source of heat energy which may be converted into mechanical movement. The switch may function to open a circuit either upon discontinuance of engine operation or upon the occurrence of some other change in engine operation.

While certain preferred embodiments of the invention have been illustrated and described, it will be apparent that various changes and modifications may be made therein without departing from the scope of the invention, as defined by the appended claims.

I claim:

1. In a control switch for a motor vehicle electrical circuit having a control member selectively movable between and open and closed circuit positions, means automatically moving said control member from closed circuit position to open circuit position comprising means normally bliasing said control member to open circuit position, movable detent means engaging said control member in the closed circuit position thereof retaining the same in closed cricuit position against the force of said biasing means, said detent means having first and second positions of engagement with said control member, and operating means connected to said detent means and to a vehicle engine energy source variable in response to operating conditions of the engine moving said detent means from said first member engaging position to said second member engaging position upon and during operation of the engine in predetermined manner and moving said detent means from said second member engaging position to said first member engaging position when the engine is not operating in said pre-determined manner, said first and second positions of engagement of said detent means being spaced from one another for disengaging said detent means from said control member and thereby releasing said control member upon each movement of said detent means, whereby to accommodate movement of said control member by said biasing means from closed circuit position, if the same is so set, to open circuit position.

2. In a control switch as set forth in claim 1, said detent means comprising a member movable transeversely of the direction of movement of said control member and having spaced elements thereon comprising first and second detent means alternately engaging said control member.

3. In a control switch as set forth in claim 1, said operating means comprising means normally biasing said detent means into said first member engaging position, and an actuator connected to said detent means and to said vehicle engine energy source and energized thereby upon and during operation of the engine in said predetermined manner for moving said detent means into said second member engaging position.

4. In a control switch as set forth in claim 1, said operating means comprising solenoid means connected in the electrical circuit of the engine.

5. In a control switch as set forth in claim 1, said operating means comprising piston means connected in a fluid pressure system of the engine.

6. In a motor vehicle control switch having a control member selectively movable between an open circuit position and successive closed circuit position; the improvement comprising, in combination, engagement means in spaced apart succession on opposite surfaces of said control member and corresponding respectively to said closed circuit positions thereof, detent means mounted for reciprocal movement in a direction angularly related to the direction of movement of said control member, said detent means engaging with the engagement means on one surface of said control member when moved in one direction and with the engagement means on the opposite surface of said control member when moved in the opposite direction, means connected to said detent means and to an energy source variable in response to operation of the motor vehicle engine for moving said detent means in said one direction in response to engine operation in a predetermined manner and for moving said detent means in said opposite direction in response to a predetermined change in engine opreation, and means biasing said control member in the direction of its open circuit position, said control member being manually movable from open circuit position to any closed circuit position against the force of said biasing means, whereby said control member is manually movable to closed circuit position and held therein by said detent means against the force of said biasing means in response to engine operation in said predetermined manner and is automatically restored by said biasing means in response to said predetermined change in engine operation, and whereby said control member is manually movable to closed circuit position and held therein by said detent means against the force of said biasing means during said predetermined change in engine operation and is automatically restored by said biasing means upon resumption of engine operation in said predetermined manner.

7. In a control switch as set forth in claim 6, said means for moving said detent means including means for retarding movement of said detent means in said opposite direction, thereby providing a time delay in restoring said control member.

8. In a control switch as set forth in claim 3, said actuator comprising solenoid means connected in the electrical circuit of the engine and energized upon operation of the engine.

9. In a control switch as set forth in claim 3, said actuator comprising piston means connected in a fluid pressure system of the engine and operated upon operation of the engine.

References Cited by the Examiner

UNITED STATES PATENTS 2,611,841 9/1952 Boyce _____ 200.61
3,125,702 3/1964 Herridge et al. _____ 315—83 X BERNARD A. GILHEANY, *Primary Examiner.*

G. J. MAIER, *Assistant Examiner.*